(12) United States Patent
Clark

(10) Patent No.: US 9,645,950 B2
(45) Date of Patent: May 9, 2017

(54) LOW-COST BACKUP AND EDGE CACHING USING UNUSED DISK BLOCKS

(71) Applicant: Jonathan Clark, Palo Alto, CA (US)

(72) Inventor: Jonathan Clark, Palo Alto, CA (US)

(73) Assignee: VMware, Inc., Palo Alto, CA (US)

(*) Notice: Subject to any disclaimer, the term of this patent is extended or adjusted under 35 U.S.C. 154(b) by 190 days.

(21) Appl. No.: 13/756,454

(22) Filed: Jan. 31, 2013

(65) Prior Publication Data
US 2014/0215173 A1    Jul. 31, 2014

(51) Int. Cl.
*G06F 12/00* (2006.01)
*G06F 17/30* (2006.01)
*G06F 12/16* (2006.01)
*G06F 11/14* (2006.01)

(52) U.S. Cl.
CPC .......... *G06F 12/16* (2013.01); *G06F 11/1456* (2013.01); *G06F 11/1464* (2013.01); *G06F 17/30067* (2013.01)

(58) Field of Classification Search
CPC ............... G06F 17/30067; G06F 12/16; G06F 11/1456; G06F 11/1464
USPC .......................................................... 707/827
See application file for complete search history.

(56) References Cited

U.S. PATENT DOCUMENTS

| | | | | |
|---|---|---|---|---|
| 6,615,224 B1* | 9/2003 | Davis | ............................ | 707/610 |
| 7,174,352 B2* | 2/2007 | Kleiman | ............. | G06F 11/1435 |
| 2002/0007363 A1* | 1/2002 | Vaitzblit | ............. | G06F 11/1471 |
| 2003/0033308 A1* | 2/2003 | Patel | ................... | G06F 11/1076 |
| 2006/0010174 A1* | 1/2006 | Nguyen et al. | ................ | 707/202 |
| 2006/0112140 A1* | 5/2006 | McBride | ............... | G06F 3/0611 |
| 2007/0027937 A1* | 2/2007 | McGrattan | .......... | G06F 11/1451 |
| 2008/0243958 A1* | 10/2008 | Prahlad et al. | ............... | 707/204 |
| 2010/0070698 A1* | 3/2010 | Ungureanu | ........ | G06F 17/30067 711/108 |
| 2012/0030411 A1* | 2/2012 | Wang et al. | ................... | 711/103 |
| 2012/0036394 A1* | 2/2012 | Feng | .................... | G06F 11/1662 714/4.12 |

* cited by examiner

*Primary Examiner* — Heather Herndon
*Assistant Examiner* — Lin Lin Htay

(57) ABSTRACT

A designated storage system receives a request to store data in the local storage as a backup copy. The designated storage system requests a file system in the computer system to store the backup copy as a file in the local storage and maintains a record describing storage locations for each of the one or more sets of contiguous available file system data blocks. The storage system may transmit the record to a management computer configured to track which of the computer systems has stored the backup copy. The storage system then requests the file system to delete the file, whereupon the file system removes the file descriptor and frees the one or more file system data blocks in order to satisfy the deletion request but does not delete the data stored in the one or more file system data blocks.

21 Claims, 3 Drawing Sheets

LOW-COST BACKUP AND EDGE CACHING USING UNUSED DISK BLOCKS

BACKGROUND

Software running on a computer system (i.e., a data source) may replicate data stored at the data source to other computer systems with unused disk storage (i.e., storage systems) for the purpose of backup and/or data distribution. Many information technology (IT) departments of corporations have data retention policies that require the periodic backing up of various data stored in employees' corporate-issued personal computers (e.g., documents, spreadsheets, email, etc.) as well as data stored in the data centers of such enterprises (e.g., company financials, back-end systems, etc.). Maintaining a sufficient amount of dedicated enterprise-grade storage to support such data retention policies can be a significant cost to a corporation. In the aggregate, unused portions of local storage in employees' corporate-issued personal computers and existing corporate servers, at any particular point in time, may comprise a significant amount of storage that simply lies fallow. While, in theory, such unused storage could alleviate the storage pressures of a corporation's data retention policies, obvious issues regarding (1) the reliability of such local storage, and (2) the possibility of using up local storage that was originally provided for a different purpose (e.g., for use by an employee to accomplish his job duties if in the employee's corporate-issued personal computer, etc.) deter corporations from trying to leverage such local storage to satisfy data retention policies.

In a different use case for replication of data, content distribution networks, such as a nation-wide television network, may include one or more clusters of video servers at a network operations center and a hierarchy of regional and local caching servers throughout the network to facilitate faster distribution of video data when requested by a consumer's media center computer system. In this use case, content distribution software running on the video servers may replicate video data out to the regional and local caching servers in anticipation of high demand in order to minimize bandwidth consumption across the network and also to reduce latency experienced by the end user at the moment when they request the video data. Such media center computer systems regularly include large local storage drives to store video data, which also present potentially significant amounts of available storage space (as well as similar issues with respect to utilizing that available storage space).

SUMMARY

Particular embodiments provide replication of data to multiple designated storage systems in a network. A designated storage system receives a request to store data in the local storage as a backup copy. The designated storage system requests a file system in the computer system to store the backup copy as a file in the local storage, wherein the file system stores the backup copy in one or more sets of contiguous available file system data blocks and generates a file descriptor that tracks the one or more file system data blocks used to store the backup copy. The designated storage system maintains a record describing storage locations for each of the one or more sets of contiguous available file system data blocks to a management computer configured to track which of the computer systems has stored the backup copy. The storage system may transmit the record to a management computer configured to track which of the computer systems has stored the backup copy. The designated storage system then requests the file system to delete the file, whereupon the file system removes the file descriptor and frees the one or more file system data blocks in order to satisfy the deletion request but does not delete the data stored in the one or more file system data blocks and wherein the file system may subsequently overwrite the backup copy that is stored in the one or more file system data blocks.

DETAILED DESCRIPTION

Figure 1:
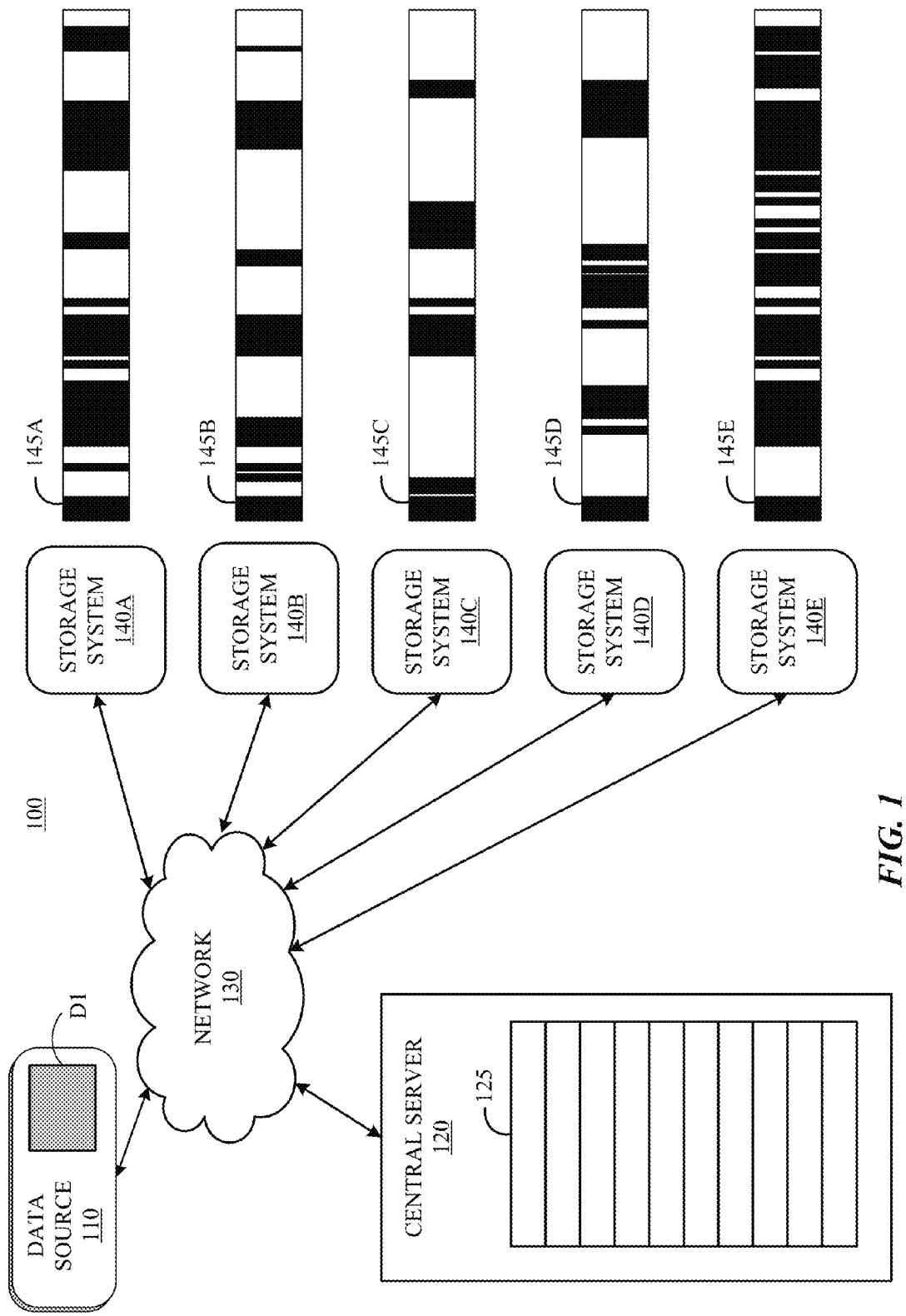
FIG. 1 depicts an example computing environment in which embodiments may be practiced.

FIG. 1 depicts an example computing environment 100 in which embodiments may be practiced. Data source 110 is a computing system in a corporation's computing environment 100 that need to be backed up in accordance with the corporation's data retention policies. For example, data source 110 may be a company-issued personal computer of an employee whose local storage needs to be backed up (although it should be recognized that any computing system that needs to cache or otherwise backup its storage can be considered a "data source" in alternative embodiments). In one embodiment, each data source 110 includes a back-up "agent" that manages the process of backing up data in the data source. For example, back-up agent may be a background application running on top of an operating system that interacts with data at the file system level, although it should be recognized that the backup agent may be implemented in a variety of alternative ways, including as an operating system level daemon or an additional component embedded with the file system level, etc.

The backup agents running in data source 110 communicate with a central server 120 through corporate network 130 to determine which of a number of storage systems 140A-140E to transmit data in data source 110 to during a periodic back-up process (e.g., as required by the corporations data retention policy, although it should be recognized that such back-up processes may be performed for any reason and at any time in alternative embodiments). As depicted in the particular embodiment of FIG. 1, each storage system 140, while availing its local data storage as backup storage for data source 110, is either a corporate-issued personal computer of an employee within the corporation, a corporate server, or any other computing system within the corporation that has been configured to perform a particular task for the corporation (e.g., that is different from actually serving as a dedicated storage system for data source 110).

As further detailed below, in order to track which of storage systems 140 stores backups for particular portions of data of data source 110, central server 120 maintains a database or other data structure 125 that maps particular data in a data source 110 (e.g., data A and data B in data source 110 of FIG. 1) to particular locations in local storage 145 of storage systems 140 that store a backup copy of such data. By maintaining such mappings of storage locations, central server 120 can be accessed by an IT department to find and restore data from storage systems 140 in the event of a failure of a data source 110. In order to communicate with backup agents running in data source 110 as well as with central server 120, each storage system also includes a corresponding backup agent that registers with central server 120 (e.g., to indicate availability to provide backup storage) and, as discussed in further detail below, receives data from the backup agents in data source 110 and communicates internally with a file system running in storage system 140 to store such received data in available file system level data blocks in the local storage 145 of the storage system 140 (e.g., for illustration purposes, shaded portions of local storage 145 in the embodiment of FIG. 1 represent used file system level data blocks). It should be recognized that the foregoing description is merely one computing environment in which the backup techniques described herein may be implemented and that alternative computing environments may utilize different components with different functions and responsibilities. For example, in an alternative embodiment, rather than having backup agents transmit data directly between data source 110 and storage systems 140, central server 120 may serve as an intermediary through which all data is passed. Similarly, rather than using specialized backup agents as discussed above, other embodiments may utilize a central server 120 that manages the entire backup process by directly accessing the file systems of data source 110 and storage systems 140 using currently existing file system networking technologies (e.g., NFS, Windows networking, etc.).

Figure 2:
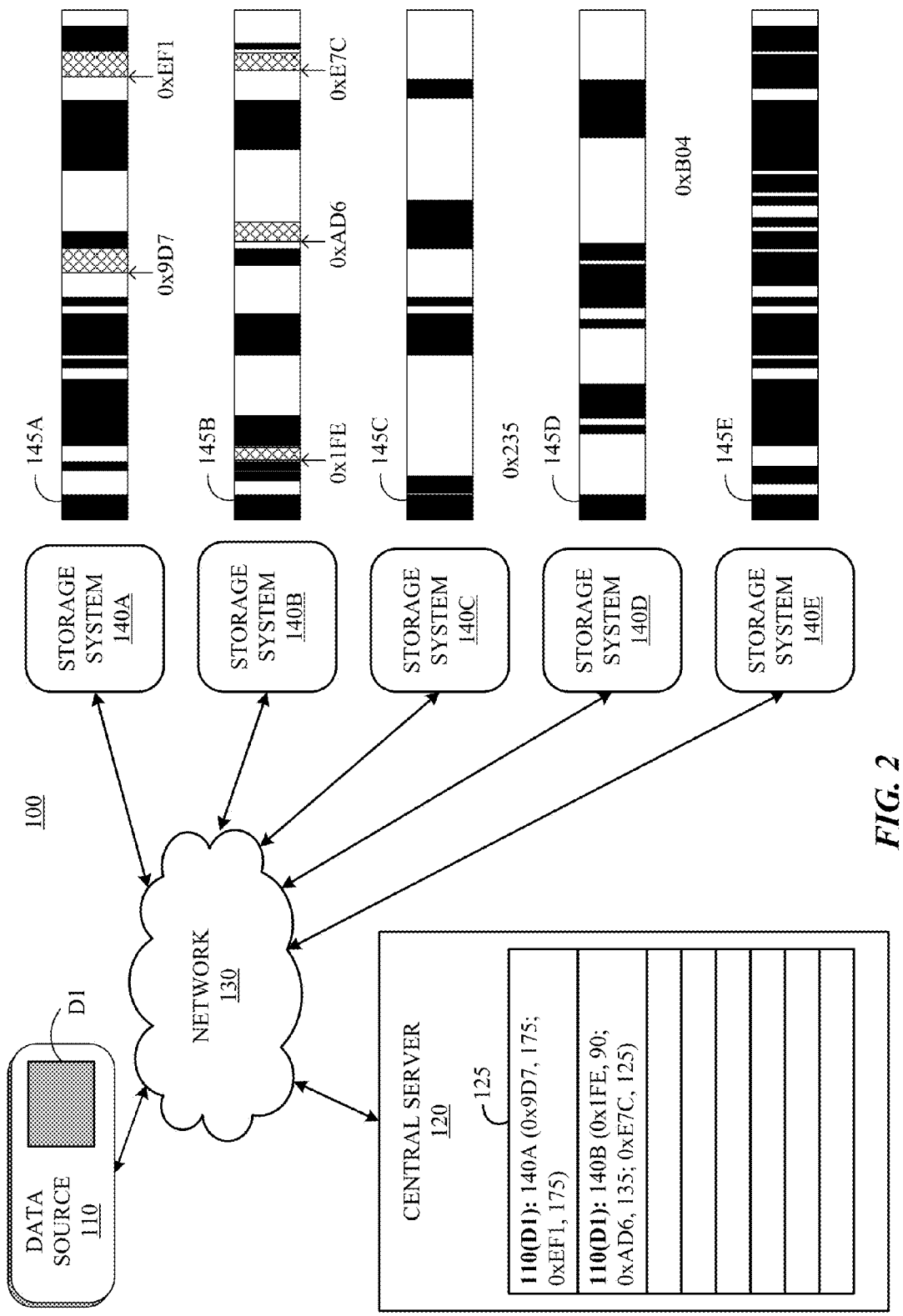
FIG. 2 illustrates an example scenario where data is replicated to multiple designated storage systems in the example network.
Figure 3:
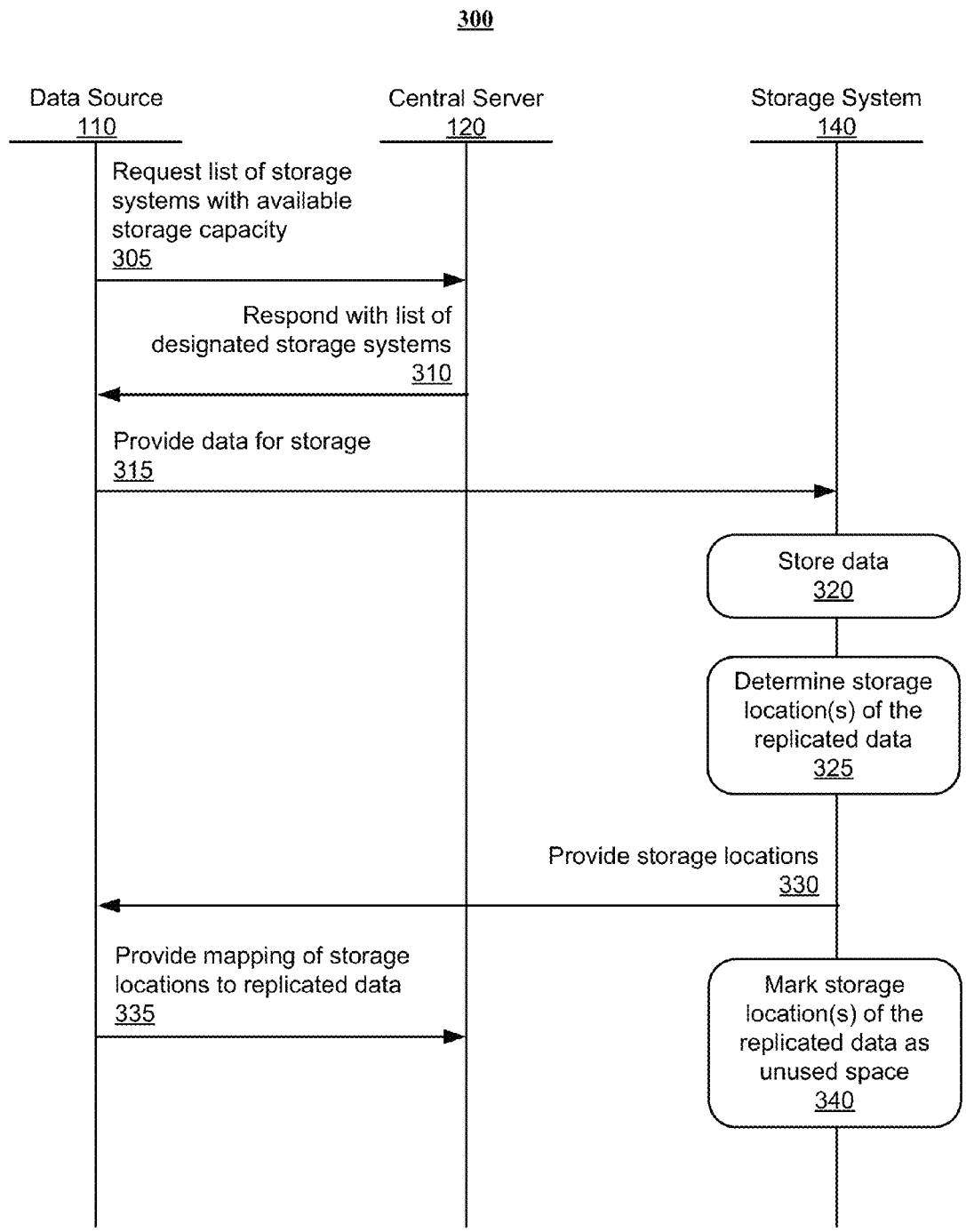
FIG. 3 is an interaction diagram describing a flow for replicating data in a network of distributed nodes using deallocated disk blocks.

FIG. 2 illustrates an example scenario where data D1 from data source 110 is replicated to multiple designated storage systems in the example computing environment of FIG. 1 and FIG. 3 provides a corresponding flow of steps performed by the various components in the computing environment. In the embodiment of FIG. 2A, data D1 in data source 110 is a portion of data that the backup agent of data source 110 desires to backup (e.g., in accordance with the corporation's data retention policies, etc.), such as a database storing the corporation's financial information or a virtual disk file comprising an employee's working files and applications. When the backup agent of data source 110 determines that data D1 should be backed up, it communicates with central server 120 to determine which storage systems 140 have enough available storage capacity to store data D1 at step 305, (e.g., it should be recognized that in different embodiments, the backup agents in storage systems 140 may periodically transmit such storage availability to central server 120 or central server 120 may transmit requests to storage systems 140 for such storage availability "on demand" when it receives a backup request from a data source). For example, the communication from the backup agent of data source 110 to central server 120 may include the size of data D1 as well as number of copies of data D1 that the backup agent desires to replicate to the storage systems 140. As previously discussed, because local storage at storage systems 140 may be less robust than enterprise storage systems, and, as further discussed below, because the techniques herein do not necessarily guarantee that copies of data D1 will be persistently stored at the storage systems (i.e., such copies could be subsequently overwritten), the backup agent of data source 110 may desire to replicate enough copies of data D1 across a number of storage systems 140 to minimize the chance that all copies of D1 stored at storage systems 140 are eliminated due to failure of the storage system that stored a copy of D1 or a subsequent overwriting of the copy of D1 at the storage system.

In response to the backup agent's communication, at step 310, central server 120 may provide to the backup agent a number of storage systems 140 that have enough storage availability to store a copy of data D1 or at least a significant portion of data D1 (e.g., in the case of the particular embodiment of FIG. 2A, central server 120 provides data source 110 with storage systems 140A and 140B for storage of data D1). Although central server 120 of FIG. 2 utilizes the availability of storage capacity to choose storage systems to provide to the backup agent of central server 140, alternative embodiments of central server 120 may selects storage systems 140 using any other appropriate methodology (e.g., round-robin, security policies, failure rate, etc.).

Upon receiving the identification of storage systems 140 that have been selected by central server 120, the backup agent of data source 110, in step 315, communicates with the backup agents of the selected storage systems 140 in order to provide data D1 for storage at such storage systems 140. Upon receiving data D1 to store within the local storage 145 of its storage system 140 in step 320, the backup agent of storage system 140 interacts with the file system of storage system 140 to store data D1 (e.g., as a file) in local storage 145. In one embodiment, the backup agent, in step 320, writes data D1 to a file using standard file system I/O write functions. It should be recognized that the file system will automatically determine the number and location of available file system data blocks to store data D1. For example, in creating a file containing data D1, the file system of storage system 140 may create and maintain a file descriptor or inode for the file. In one embodiment, such a file descriptor or inode may contain a raw disk offset denoting the beginning of an initial file system data block, as well the length of the contiguous data blocks that store data D1 (and essentially comprise the file). If data D1 cannot be stored in a single set of contiguous file system data blocks, the file descriptor or inode, as further described below and as depicted in FIG. 2, may contain a number of disk offset/length pairs corresponding to a number of fragments (e.g., sets of contiguous file system data blocks) into which the file system divides data D1. It should be recognized that in certain situations, a particular disk offset/length pair may simply correspond to a single file system data block. As should be further recognized, in an alternative implementation of the file system, the file descriptor or inode may contain a list of the identifications of the file system data blocks that comprise data D1 themselves, however fragmented or contiguous, rather than contain disk offsets and lengths (while further alternatives may use a mix of disk offset/length pairs and file system data block identifications). The file system may then mark entries corresponding to the file system data blocks allocated to the file in a file system data block bitmap that it maintains to track free and allocated file system data blocks.

Once the file system completes storing data D1 in a file in local storage 145, the backup agent of storage system 140 obtains the storage locations (e.g., disk offset/length pairs, list of file system data block numbers, etc., depending upon embodiments) in step 325, by, for example, requesting such information from the file system (e.g., which in turn obtains such information stored in the file descriptor or inode of the file). In step 330, the backup agent of storage system 140 provides the storage locations to the backup agent of data source 110, which in turn, in step 335, provides a mapping of data D1 to the storage locations to central server 120 to maintain in its data structure 125 (although it should be recognized that alternative embodiment may have the backup agent of storage system 140 provide such information directly to central server 120 rather than through the backup agent of data source 110). In the example illustrated in FIG. 2, the first entry in data structure 125 indicates that the file system of storage system 140A has backed up data D1 into local storage 145A in two fragments: the first fragment starting at storage location 0x9D7 (at the beginning of the data block) and occupying 175 contiguous data blocks, and the second fragment starting at storage location 0xEF1 and occupying another 175 contiguous data blocks. The second entry in data structure 125 indicates that the file system of storage system 140B has backed up data D1 into local storage 145B in three fragments: the first fragment starting at storage location 0x1FE and occupying 90 contiguous data blocks, the second fragment starting at storage location 0xAD6 and occupying another 135 contiguous data blocks, and the third fragment starting at storage location 0xE7C and occupying another 125 contiguous data blocks. It should be recognized that in alternative embodiments, central server 120 may be able to further subdivide data to be backed up (e.g., such as data D1) into segments that can be separately stored in separate storage systems 140 (e.g., such that re-creating a complete copy of the data would involve extracting such segments from separate storage systems 140).

It should be recognized that, when the corporation's IT department requests central server 120 to recreate data D1 (e.g., because of a failure of data source 110), central server 120 provides the storage locations to the backup agent of the relevant storage system, which in turn, provides the contents of the file system data blocks at those storage locations back to central server 120 to reconstruct data D1.

Once the backup agent of storage system 140 has ultimately provided the storage locations of the file system data blocks to central server 120, the backup agent, in step 340, then issues a request to the file system of storage system 140 to mark the storage locations as available storage space, e.g., by deleting the file containing data D1. In "deleting" the file, the file system in embodiments only removes the file descriptor or inode from its data structures and frees up the relevant entries corresponding to the file in its file system data block bitmap, but does not actually delete the contents of such file system data blocks. In this manner, the actual file system data blocks still contain the contents of D1, although the file system itself now considers such file system data blocks to be free for all intents and purposes. As such, as previously discussed, data D1 is not guaranteed to be persistently stored in storage system 140 since any subsequent primary activities of storage system 140 (e.g., as a corporate-issue personal computer of an employee, database for back-end financial information, etc.) may cause the file system of storage system 140 to overwrite the file system data blocks that contain data D1.

Since, as described above, data D1 stored at a storage system 140 is not guaranteed to persist, in certain embodiments, backup agent of data source 110 may provide a hash value of data D1 to store at central server 120, for example, during step 305 or step 335. As such, if data D1 needs to be retrieved by central server 120 from storage system 140 due to a failure of data source 110, when central server 120 reconstructs the requested backup of data D1 in storage system 140 from central server's 120 stored mapping of storage locations in data structure 125, central server 120 can subsequently verify the integrity of the reconstructed data by calculating a hash of the reconstructed data and comparing it to the stored hash of data D1. It should be recognized that alternative embodiments may store and calculate a hash of data D1 within different components of computing environment 100. For example, in an alternative environment, an storage system 140 in which the data D1 was stored can calculate a hash based on the data residing in the noted storage locations (e.g., and compare it to the hash of data D1, as provided to it by central server 120) to verify the integrity of the data prior to actually transmitting any of such data to central server 120.

Although one or more embodiments of the present invention have been described in some detail for clarity of understanding, it will be apparent that certain changes and modifications may be made within the scope of the claims. For example, in a peer-to-peer-based embodiment, the functions handled by the central server 120 may instead be handled by each data source on its own. In such an embodiment, a data source maintains its own list of candidate storage systems and selects which storage systems are to be designated for replication of data D1. For example, in a school network, students may be equipped with laptops that handle data replication on a peer-to-peer basis, and each student may choose to add the trusted computers of their group of friends or classmates as candidate storage systems. The backup agent running on a student's laptop selects the designated storage systems from the list of candidate storage systems and provides data D1 for storage to the designated storage systems. The mapping of storage locations is then maintained at the data source (i.e., the student's laptop). In some embodiments, the backup agent running on the data source 110 may utilize encryption to secure data D1 prior to transmitting data D1 to the storage systems 140.

In certain embodiments, central server 120 may be further configured to periodically poll or otherwise communicate with relevant storage systems 140 at which a particular piece of data was stored, in order to verify that the data is still resident in storage and uncorrupted at such storage systems 140 (e.g., by using the foregoing hashing techniques to verify the integrity). If, for example, central server 120 determines that data stored at a particular storage system has become corrupted, it may begin the process of replicating another copy of the data to be stored at the storage system (or any other available storage system) in order to maintain a minimum number of replicated copies of the data across the storage systems. On some platforms, file system utilities may be available that enable the storage system to calculate which blocks in local storage 145 are least likely to be overwritten soon, and also to move the cached data to those blocks.

In certain embodiments, a storage system 140 may ignore requests from the central server 120 and/or from a data source 110 in order to prevent or reduce any performance impact upon other tasks being executed by the storage system. And correspondingly, a data source 110 that is attempting to retrieve replicated data from a storage system 140 may automatically switch between storage systems to recover a lost or corrupted data fragment, or simply to achieve better performance during retrieval.

It should be recognized that use of certain terminology that may be more commonly used with certain operating systems than others is merely exemplary not meant to limit the scope of the teachings herein to any particular operating system and that corresponding functions and components in other operating system platforms may benefit from the teachings herein.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Disc)—CD-ROM, a CDR, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims. The scope of this disclosure encompasses all changes, substitutions, variations, alterations, and modifications to the example embodiments described or illustrated herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

What is claimed is:

1. A distributed computing system configured to maintain backup copies of data, the distributed computing system comprising a data source computer system communicatively coupled to a plurality of storage computer systems, each computer system comprising a physical processor and a local storage, the processor of the data source computer system configured by software to perform the steps of:

providing a backup copy of the data to a set of two or more storage systems that have available local storage to store the backup copy wherein, in response, the processor of each of the storage system in the set is configured to perform the following steps:

receiving the backup copy of the data from the data source computer;

storing the backup copy as a file in the local storage using a file system, wherein the file system stores the backup copy in one or more sets of available file system data blocks and generates a file descriptor that tracks the one or more sets of file system data blocks used to store the backup copy;

providing, to the data source computer system, a block location record describing storage locations of the one or more sets of file system data blocks in the local storage corresponding to the data of the file, wherein the block location record is different from the file descriptor;

deleting the file using the file system, whereupon, in response, the file system deletes the file by removing the file descriptor without deleting the contents of the corresponding data blocks;

receiving, at the storage system, a request from the data source computer to provide the contents of the deleted file having the deleted file descriptor, wherein the request from the data source computer includes information included in the block location record identifying the data blocks in the local storage of the storage system that correspond to the data of the file;

retrieving the contents of the data blocks for the deleted file identified in the request using the information included in the block location record; and transmitting the contents of the data blocks to the data source computer.

2. The distributed computing system of claim 1, wherein each of the storage computer systems performs alternative but primary activities unrelated to storing the data as the backup copy.

3. The distributed computer system of claim 1, wherein the data source computer system is further configured to transmit the block location record to a management computer configured to track which of the storage computer systems has stored the backup copy.

4. The distributed computing system of claim 3, wherein each of the set of storage computer systems is further configured to perform the steps of:
receiving from the management computer a request to retrieve the backup copy, wherein the request includes the block location record and a first hash value derived from the backup copy;
calculating a second hash value derived from the data blocks of the deleted file; and
comparing the first hash value to the second hash value to determine whether the data blocks of the deleted file matches the backup copy.

5. The distributed computer system of claim 4, wherein each of the set of storage computer systems is further configured to perform the steps of (1) providing the data blocks of the deleted file to the management computer if the first hash value matches the second hash value, and (2) transmitting a notification to the management computer that the data blocks of the deleted file does not match the backup copy if the hash value does not match the second hash value.

6. The computer system of claim 1, wherein the management computer stores a mapping of an identification of the backup copy to the block location record to an identification of the computer system storing the backup copy in the one or more file system data blocks.

7. The distributed computer system of claim 1, wherein the backup copy is encrypted prior to requesting the file system to store the backup copy as a file in the local storage.

8. The distributed computer system of claim 1, wherein providing a backup copy of the data the set of storage systems includes providing a backup copy of the data to each storage system of the set such that each storage system of the set has a corresponding backup copy of the data.

9. A method for managing backup copies of data in a distributed computer system comprising:
providing a backup copy of the data from a data source computer, comprising a physical processor and a local storage, to a set of two or more storage systems that have available local storage to store the backup copy wherein, in response, each storage system in the set performs the following steps:
receiving the backup copy of the data from the data source computer;
storing the backup copy as a file in the local storage using a file system, wherein the file system stores the backup copy in one or more sets of available file system data blocks and generates a file descriptor that tracks the one or more sets of file system data blocks used to store the backup copy;
providing, to the data source computer system, a block location record describing storage locations of the one or more sets of file system data blocks in the local storage corresponding to the data of the file, wherein the block location record is different from the file descriptor;
deleting the file using the file system, whereupon, in response, the file system deletes the file by removing the file descriptor and indicating the one or more file system data blocks as free in order to satisfy the deletion request without deleting the contents of the corresponding data blocks;
receiving, at the storage system, a request from the data source computer to provide the contents of the deleted file having the deleted file descriptor, wherein the request from the data source computer includes information included in the block location record identifying the data blocks in the local storage of the storage system that correspond to the data of the file;
retrieving the contents of the data blocks for the deleted file identified in the request using the information included in the block location record; and
transmitting the contents of the data blocks to the data source computer.

10. The method of claim 9, wherein the data source computer system transmits the block location record to a management computer configured to track which of the storage computer systems has stored the backup copy.

11. The method of claim 10, wherein each storage system in the set further performs the steps of:
receiving from the management computer a request to retrieve the backup copy, wherein the request includes the block location record and a first hash value derived from the backup copy;
calculating a second hash value derived from the data blocks of the deleted file; and
comparing the first hash value to the second hash value to determine whether the data blocks of the deleted file matches the backup copy.

12. The method of claim 11, wherein each storage system in the set further performs the steps of (1) providing the data blocks of the deleted file to the management computer if the first hash value matches the second hash value, and (2) transmitting a notification to the management computer that the data blocks of the deleted file does not match the backup copy if the first hash value does not match the second hash value.

13. The method of claim 9, wherein the management computer stores a mapping of an identification of the backup copy to the block location record an identification of the storage computer system.

14. The method of claim 9, wherein the backup copy is encrypted prior to requesting the file system to store the backup copy as a file in the local storage.

15. One or more computer-readable non-transitory storage media embodying software that is operable when executed to perform the steps of:
providing a backup copy of the data from a data source computer system to a set of two or more storage systems that have available local storage to store the backup copy wherein, in response, the physical processor of each of the storage systems in the set is configured to perform the following steps:
receiving the backup copy of the data from the data source computer;
storing the backup copy as a file in the local storage using a file system, wherein the file system stores the backup copy in one or more sets of available file system data blocks and generates a file descriptor that tracks the one or more sets of file system data blocks used to store the backup copy;
providing, to the data source computer system, a block location record describing storage locations of the one or more sets of file system data blocks in the local storage corresponding to the data of the file, wherein the block location record is different from the file descriptor;
deleting the file using the file system whereupon, in response, the file system deletes the file by removing the file descriptor and indicating the one or more file system data blocks as free in order to satisfy the deletion request without deleting the contents of the corresponding data blocks;

receiving, at the storage system, a request from the data source computer to provide the contents of the deleted file having the deleted file descriptor, wherein the request from the data source computer includes information included in the block location record identifying the data blocks in the local storage of the storage system that correspond to the data of the file;

retrieving the contents of the data blocks for the deleted file identified in the request using the information included in the block location record; and transmitting the contents of the data blocks to the data source computer.

16. The media of claim 15, wherein each storage computer system performs alternative but primary activities unrelated to storing the data as the backup copy.

17. The media of claim 15, wherein the data source computer system is further configured to transmit the block location record to a management computer system configured to track which of the storage computer systems has stored the backup copy.

18. The media of claim 17 wherein each of the storage computer system is configured to further perform the steps of:

receiving from the management computer system the retrieval request for the backup copy, wherein the retrieval request includes the record and a first hash value derived from the backup copy;

calculating a second hash value derived from the data blocks of the deleted file; and comparing the first hash value to the second hash value to determine whether the data blocks of the deleted file matches the backup copy.

19. The media of claim 18 wherein each of the storage computer systems is configured to further perform the steps of: (1) providing the data blocks of the deleted file to the management computer if the first hash value matches the second hash value, and (2) transmitting a notification to the management computer that the data blocks of the deleted file does not match the backup copy if the first hash value does not match the second hash value.

20. The media of claim 15, wherein the management computer system stores a mapping of an identification of the backup copy to the data block record to an identification of the storage computer system.

21. The media of claim 15, wherein the backup copy is encrypted prior to requesting the file system to store the backup copy as a file in the local storage.

* * * * *